US009583135B1

(12) United States Patent
Ma et al.

(10) Patent No.: US 9,583,135 B1
(45) Date of Patent: Feb. 28, 2017

(54) LASER MODE HOPPING DETECTION METHOD AND APPARATUS FOR A HEAT-ASSISTED MAGNETIC RECORDING DEVICE

(71) Applicant: Seagate Technology LLC, Cupertino, CA (US)

(72) Inventors: Minjie Ma, Bloomington, MN (US); Tim Rausch, Farmington, MN (US); Edward Charles Gage, Lakeville, MN (US); Pu-Ling Lu, Rosemont, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 15/139,516

(22) Filed: Apr. 27, 2016

(51) Int. Cl.
*G11B 11/00* (2006.01)
*G11B 20/18* (2006.01)
*G11B 5/00* (2006.01)

(52) U.S. Cl.
CPC .. *G11B 20/1816* (2013.01); *G11B 2005/0021* (2013.01)

(58) Field of Classification Search
CPC ........ G11B 11/10595; G11B 11/10515; G11B 11/1053; G11B 7/14; G11B 2220/2525; G11B 220/20; G11B 2220/2537; G11B 7/126; G11B 7/0045
USPC ......... 369/53.1, 13.02, 13.14, 13.24, 112.23, 369/13.26, 13.27, 116, 120, 121; 360/313, 59
See application file for complete search history.

(56) References Cited

U.S. PATENT DOCUMENTS

| 4,737,798 A | 4/1988 | Lonis et al. |
| 4,751,377 A * | 6/1988 | Ishizaka ............. G01N 21/5911 250/205 |
| 5,048,031 A | 9/1991 | Thonn |
| 9,136,666 B1 | 9/2015 | Norberg et al. |
| 2012/0093502 A1 | 4/2012 | Gottwald et al. |

* cited by examiner

*Primary Examiner* — Nabil Hindi
(74) *Attorney, Agent, or Firm* — Hollingsworth Davis, LLC

(57) ABSTRACT

An apparatus and method provide for performing, using a heat-assisted magnetic recording head, multiple sequential writes to a recording medium, and recording a metric of write performance for each of the writes. The apparatus and method further provide for calculating fluctuations in the metric, detecting whether the head has a laser mode hopping problem using the metric fluctuations, and categorizing a severity of the laser mode hopping problem.

20 Claims, 14 Drawing Sheets

LASER MODE HOPPING DETECTION METHOD AND APPARATUS FOR A HEAT-ASSISTED MAGNETIC RECORDING DEVICE

SUMMARY

Various embodiments are directed to a method comprising performing, using a heat-assisted magnetic recording head, multiple sequential writes to a recording medium, and recording a metric of write performance for each of the writes. The method comprises calculating fluctuations in the metric, and detecting whether the head has a laser mode hopping problem using the metric fluctuations. The method also comprises categorizing a severity of the laser mode hopping problem.

Some embodiments are directed to an apparatus comprising a heat-assisted magnetic recording head comprising a reader, a writer, and a near-field transducer optically coupled to a laser diode via an optical waveguide. A controller of the head is configured to perform multiple sequential writes to a recording medium, record a metric of write performance for each of the writes, calculate fluctuations in the metric, detect whether the laser diode has a laser mode hopping problem using the metric fluctuations, and categorize a severity of the laser mode hopping problem.

Other embodiments are directed to a method implemented in response to detecting that a heat-assisted magnetic recording head has a laser mode hopping problem. The method comprises determining, in the absence of a write field producible by the head and during a writing mode above data sectors, a maximum total laser current that can be applied to a laser diode of the head before causing erasure of a pre-written data track of a recording medium. The total laser power comprises a sum of an operational current, $I_{op}$, required for writing and a bias current, $I_b$, applied to the laser diode while the head in a read mode. The method comprises varying the bias current $I_b$, between a first current level and the maximum total laser current, wherein the first current level is less than the maximum total laser current. The method also comprises recording a metric of write performance while varying the bias current, $I_b$, between the first current level or zero and the maximum total laser current. The method further comprises determining a second current level between the first current level and the maximum total laser current for which the write performance metric is acceptable, and setting the bias current, $I_b$, to the second current level for subsequent use of the head.

The above summary is not intended to describe each disclosed embodiment or every implementation of the present disclosure. The figures and the detailed description below more particularly exemplify illustrative embodiments.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

The present disclosure generally relates to heat-assisted magnetic recording (HAMR), also referred to as energy-assisted magnetic recording (EAMR), thermally-assisted magnetic recording (TAMR), and thermally-assisted recording (TAR). This technology uses a laser source and a near-field transducer (NFT) to heat a small spot on a magnetic disk during recording. The heat lowers magnetic coercivity at the spot, allowing a write transducer to change the orientation of a magnetic domain at the spot. Due to the relatively high coercivity of the medium after cooling, the data is less susceptible to superparamagnetism effects that can lead to data errors.

Figure 1:
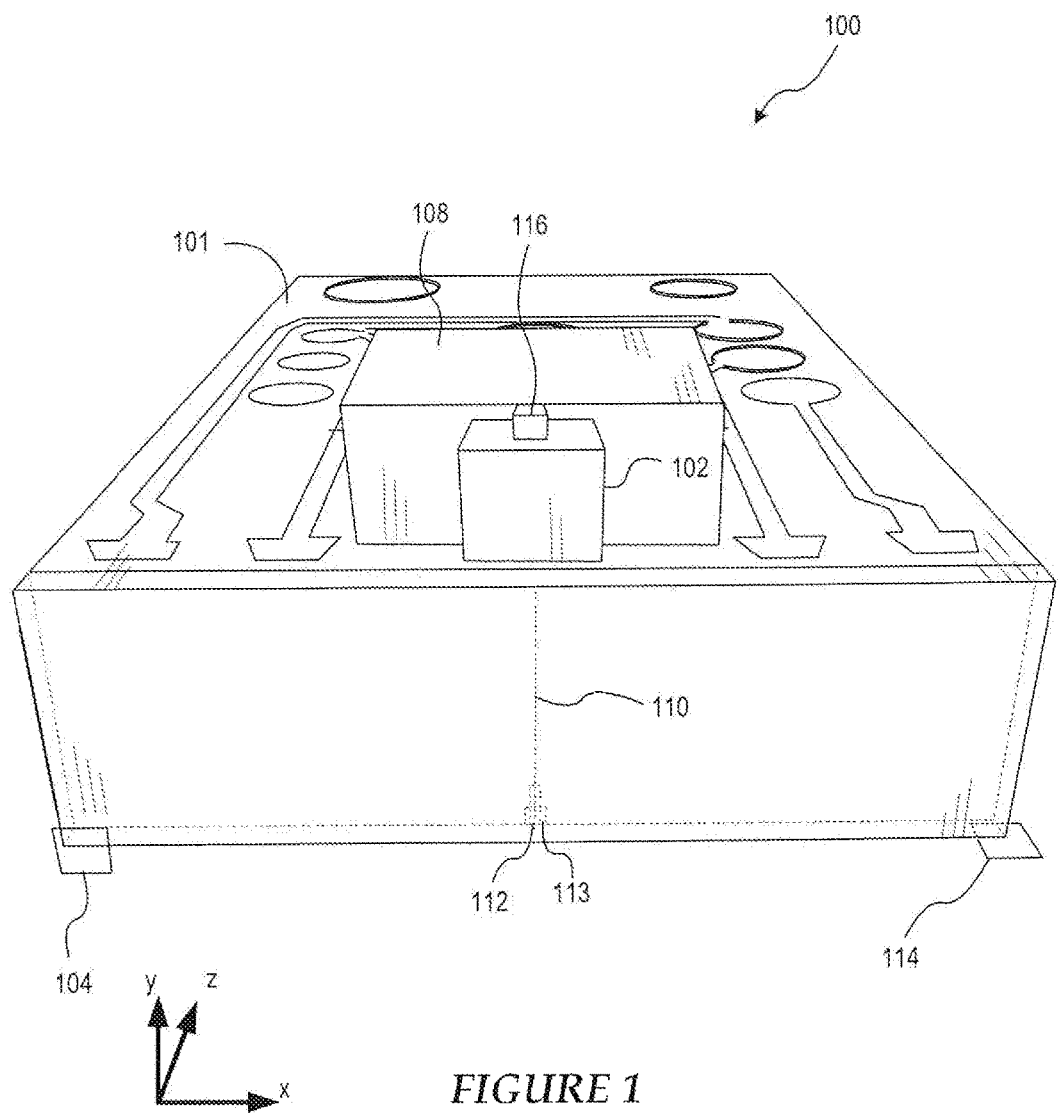
FIG. 1 is a perspective view of a HAMR slider with which various embodiments disclosed herein may be implemented.
Figure 2:
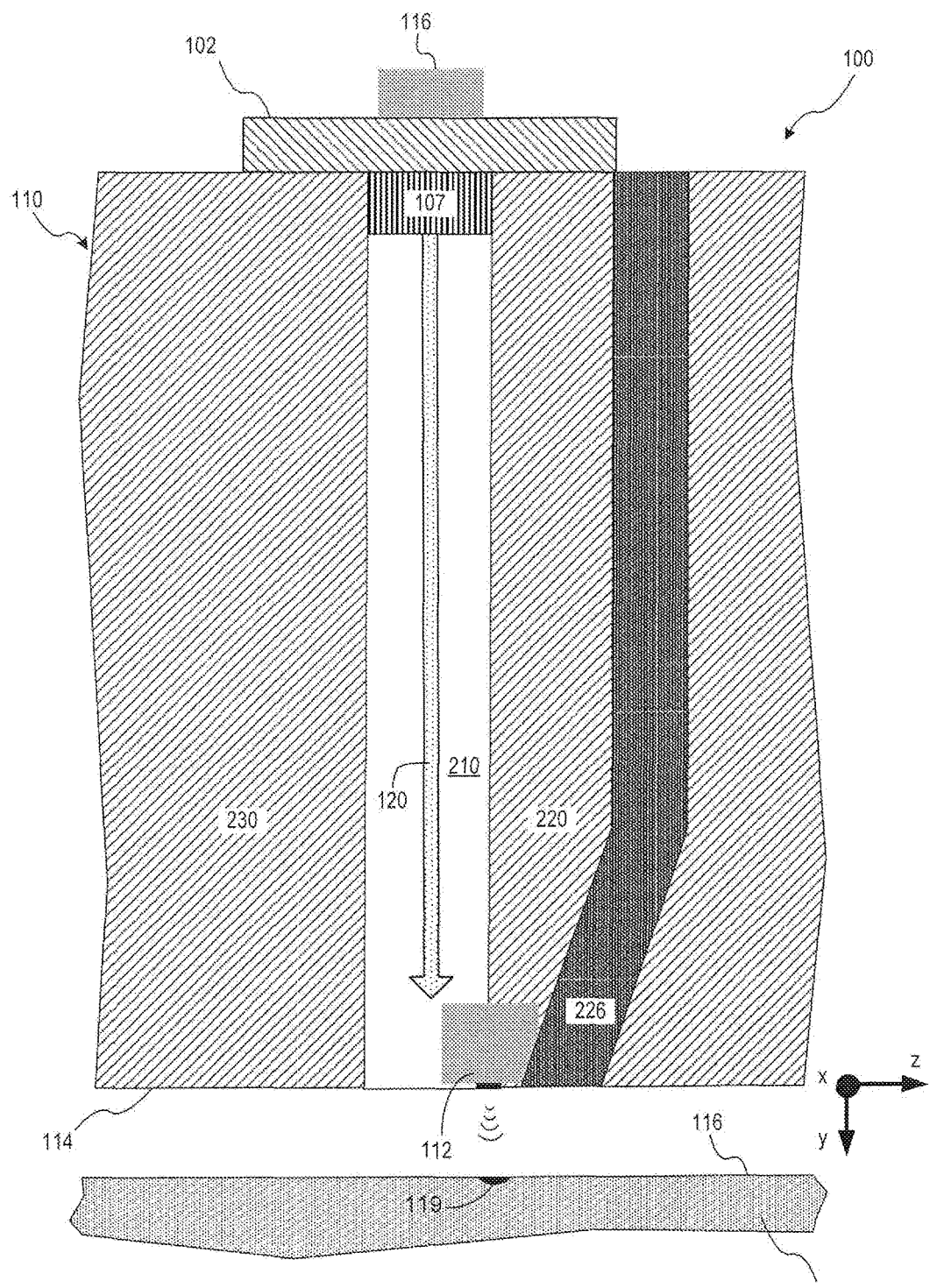
FIG. 2 is a cross-sectional view of a HAMR slider with which various embodiments disclosed herein may be implemented.

Embodiments of a HAMR head 100 are illustrated in FIGS. 1 and 2. As shown, the head 100 (also referred to as a slider) includes a light source (e.g., a laser diode) 102 located proximate a trailing edge surface 104 of the slider body 101. An optical wave (e.g., a laser beam) 120 generated by the light source 102 is delivered to an NFT 112 via an optical waveguide 110. The NFT 112 is aligned with a plane of an air bearing surface (ABS) 114 of the head 100, and one edge of a read/write head 113 is on the ABS 114. The read/write head 113 includes at least one writer and at least one reader. In some embodiments, multiple writers (e.g., 2 writers) and multiple readers (e.g., 3 readers) can be incorporated into the read/write head 113. The ABS 114 faces, and is held proximate to, a surface 116 of a magnetic medium 118 during device operation. The ABS 114 is also referred to as a media-facing surface.

The light source 102 in this representative example may be an integral, edge firing device, although it will be appreciated that any source of electromagnetic energy may be used. For example, a surface emitting laser (SEL), instead of an edge firing laser, may be used as the source 102. A light source may also be mounted alternatively to other surfaces of the head 100, such as the trailing edge surface 104. While the representative embodiments of FIGS. 1 and 2 show the waveguide 110 integrated with the head 100, any type of light delivery configuration may be used.

As shown in FIG. 1, the laser diode 102 is shown coupled to the slider body 101 via a submount 108. The submount 108 can be used to orient and affix an edge-emitting laser diode 102 so that its output is directed downwards (negative y-direction in the figure). An input surface of the slider body 101 may include a grating, and optical coupler or other coupling features to receive light from the laser diode 102. The head 100 also includes an optical energy measurement sensor, such as photodetector 116 (e.g., a photodiode), situated proximate the light source 102. The photodetector 116 is configured to measure of intensity the laser light output.

When writing with a HAMR device, electromagnetic energy is concentrated onto a small hotspot 119 over the track of the magnetic medium 118 where writing takes place, as is shown in the embodiment of FIG. 2. The light from the light source 102 propagates to the NFT 112, e.g., either directly from the light source 102 or through a mode converter or by way of a focusing element. FIG. 2, for example, shows an optical coupler 107 adjacent the light source 102, which is configured to couple light produced from the light source 102 to the waveguide 110.

As a result of what is known as the diffraction limit, optical components cannot be used to focus light to a dimension that is less than about half the wavelength of the light. The lasers used in some HAMR designs produce light with wavelengths on the order of 700-1550 nm, yet the desired hot spot 119 is on the order of 50 nm or less. Thus, the desired hot spot size is well below half the wavelength of the light. Optical focusers cannot be used to obtain the desired hot spot size, being diffraction limited at this scale. As a result, the NFT 112 is employed to create a hotspot on the media.

The NFT 112 is a near-field optics device configured to generate local surface plasmon resonance at a designated (e.g., design) wavelength. The NFT 112 is generally formed from a thin film of plasmonic material on a substrate. In a HAMR head 100, the NFT 112 is positioned proximate the write pole 226 of the read/write head 113. The NFT 112 is aligned with the plane of the ABS 114 parallel to the surface 116 of the magnetic medium 118. The waveguide 110 and optional mode converter and/or other optical element directs electromagnetic energy 120 (e.g., laser light) onto the NFT 112. The NFT 112 achieves surface plasmon resonance in response to the incident electromagnetic energy 120. The plasmons generated by this resonance are emitted from the NFT 112 towards the magnetic medium 118 where they are absorbed to create a hotspot 119. At resonance, a high electric field surrounds the NFT 112 due to the collective oscillations of electrons at the metal surface (e.g., substrate) of the magnetic medium 118. At least a portion of the electric field surrounding the NFT 112 gets absorbed by the magnetic medium 118, thereby raising the temperature of a spot 119 on the medium 118 as data is being recorded.

FIG. 2 shows a detailed partial cross-sectional view of an embodiment of the HAMR head 100 in accordance with various embodiments. The waveguide 110 includes a layer of core material 210 surrounded by first and second cladding layers 220 and 230. The first cladding layer 220 is shown proximate the NFT 112 and the write pole 226. The second cladding layer 230 is spaced away from the first cladding layer 220 and separated therefrom by the waveguide core 210. The core layer 210 and cladding layers 220 and 230 may be fabricated from dielectric materials, such as optical grade amorphous material with low thermal conductivities. The first and second cladding layers 220 and 230 may each be made of the same or a different material. The materials are selected so that the refractive index of the core layer 210 is higher than refractive indices of the cladding layers 220 and 230. This arrangement of materials facilitates efficient propagation of light through the waveguide core 210. Optical focusing elements (not shown) such as mirrors, lenses, etc., may be utilized to concentrate light onto the NFT 112. These and other components may be built on a common substrate using wafer manufacturing techniques known in the art. The waveguide 110 may be configured as a planar waveguide or channel waveguide.

The output of a laser diode used in a HAMR drive is temperature sensitive and susceptible to self-heating. During write operation, for example, laser diode heating can vary the junction temperature of the laser diode, causing a shift in laser emission wavelength, leading to a change of optical feedback from optical path in slider to the cavity of the laser diode, a phenomenon that is known to lead to mode hopping and/or power instability of the laser diode. Mode hopping is particularly problematic in the context of single-frequency lasers. Under some external influences, a single-frequency laser may operate on one resonator mode (e.g., produce energy with a first wavelength) for some time, but then suddenly switch to another mode (produce energy, often with different magnitude, with a second wavelength) performing "mode hopping." Temperature variation is a known factor which might cause mode hopping in laser diodes. Mode hopping is problematic for HAMR applications, as mode hopping leads to i) laser output power jumping, ii) a magnetic transition occurring earlier or later that what is expected in the down-track direction, and iii) track width decrease or increase in the cross-track direction. Large transition timing shifts in a block of data may not be recoverable by channel decoding, resulting in error bits, and the track width decrease or increase will affect the data quality of the current track or the pre-written data on the adjacent track.

Figure 3:
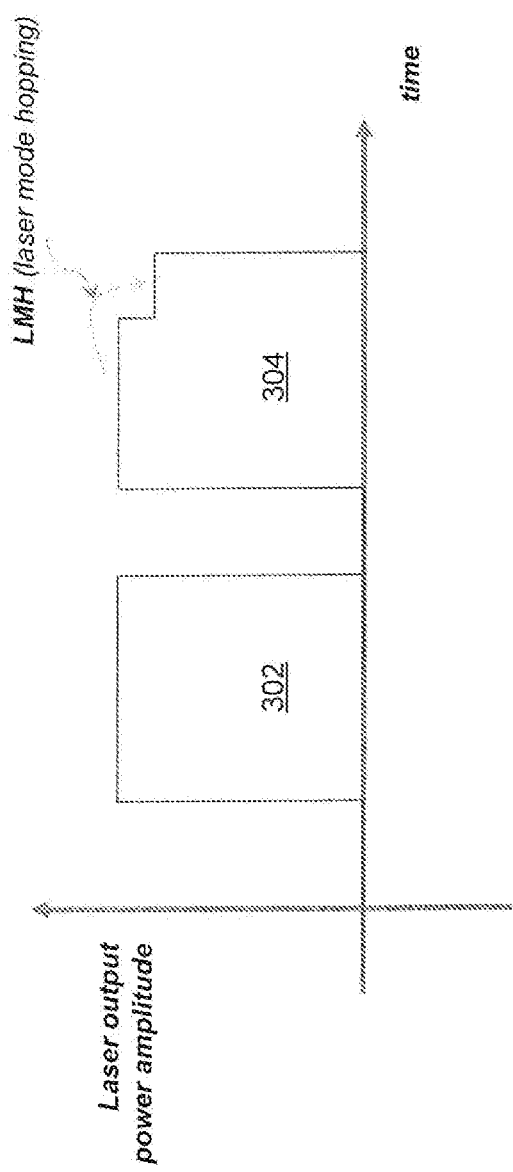
FIG. 3 is an illustration showing the effect of laser mode hopping (LMH) on laser diode output power amplitude.

FIG. 3 is a graph that illustrates the effect of mode hopping on the output of the laser diode. The graph shown in FIG. 3 shows laser output power amplitude as a function of time. A first waveform 302 is shown to have a constant output power amplitude, indicating the absence of laser mode hopping. A second waveform 304 illustrates laser mode hopping occurring toward the end of the waveform 304. As can be seen in FIG. 3, an abrupt change in laser output power amplitude occurs as a consequence of laser mode hopping. In some cases, the laser mode hopping can be non-severe, in which case the channel can correct for the output power amplitude change or some form of compensation can be implemented as a corrective action. In other cases, the laser mode hopping can be severe and, if repeatable, can render the head non-functional.

Figure 4:
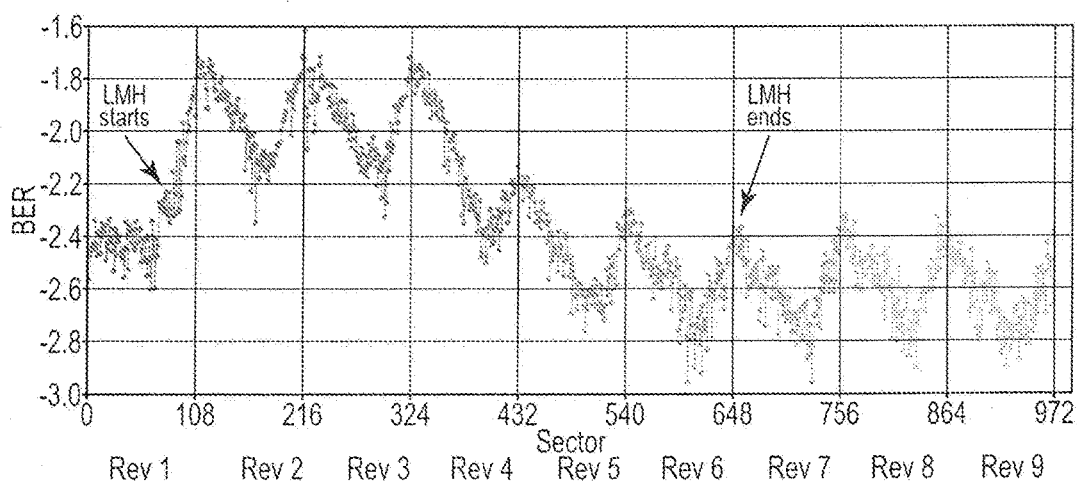
FIG. 4 is a graph showing the sector bit error rate (BER) of a HAMR head for a number of sequential writes during which laser mode hopping occurs.
Figure 5:
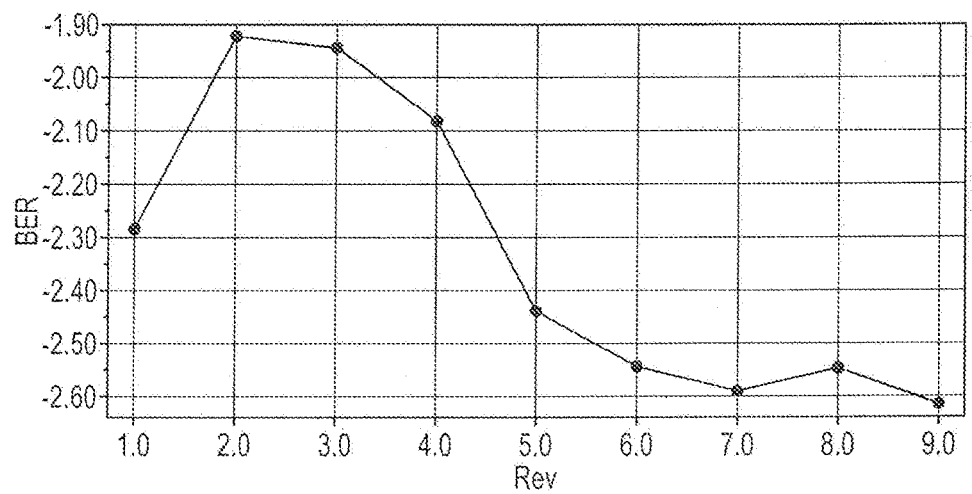
FIG. 5 shows the average BER for each of the revolutions shown in FIG. 4.

FIG. 4 is a graph showing BER from a HAMR head when writing for nine revolutions during which laser mode hopping occurs. The y-axis is given in terms of BER and the sector (and revolution number) is given along the x-axis. It can be seen that in the first revolution (Rev 1) at around the $60^{th}$ sector, a laser mode hop occurs. The laser mode hop results in a significant decrease in the BER in the first revolution and in subsequent revolutions until the seventh revolution. FIG. 5 shows the average BER for each of the revolutions shown in FIG. 4. It can be seen in FIG. 5 that it takes several revolutions of writes for the laser diode to become stable, which occurs at around the seventh revolution (Rev 7). It is noted that some minor fluctuation in the BER is normal, such as can be seen between the seventh (Rev 7) and ninth (Rev 9) revolutions.

Figure 6:
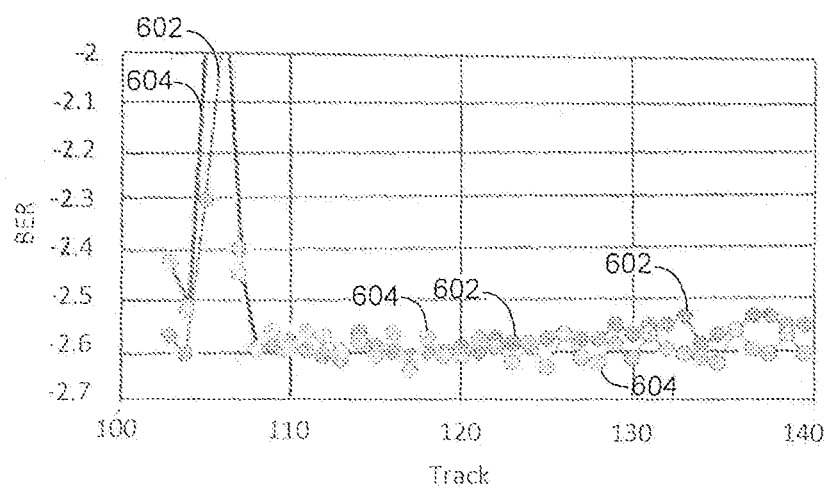
FIGS. 6 and 7 are graphs of BER versus track number during sequential writes for two different HAMR heads that show incidence of laser mode hopping observed in a HAMR drive.
Figure 7:
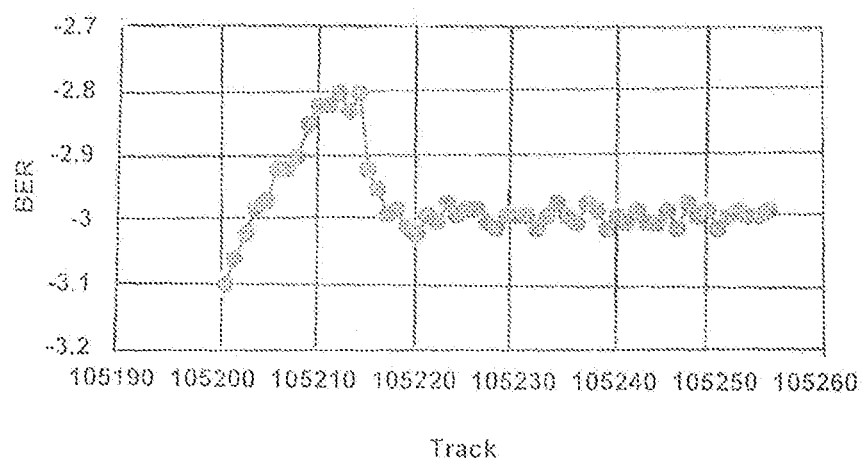

FIGS. 6 and 7 are graphs of BER versus track number during sequential writes for two different HAMR heads that show incidence of laser mode hopping observed in a HAMR drive. The data shown in FIGS. 6 and 7 were acquired in-situ the drive. In FIG. 6, a first curve 602 shows the BER without compensation processing that can be used to compensate the laser self-heating during sequential writing (e.g., LBC discussed below). One useful compensation processing methodology for laser self-heating is referred to herein as Laser Bias Compensation (LBC), details of which are provided in commonly-owned U.S. patent application Ser. No. 14/659,856 filed Mar. 17, 2015, which is incorporated herein by reference. The second curve 604 shows the BER with LBC processing, which attempts to compensate for the rapid decrease in BER between track 104 and track 108 due to the laser mode hopping but failed. However, the LBC did compensate the BER change due to laser self-heating occurring after track 108.

FIG. 6 shows that a laser mode hop occurred at about track 105. It can be seen that the laser diode becomes stable around track 108. The laser mode hop is considered severe, typically requiring additional corrective action and further monitoring (and possibly repair/replacement). FIG. 7 shows a laser mode hop beginning at around track 105204 and continuing until around track 105218.

Figure 8B:
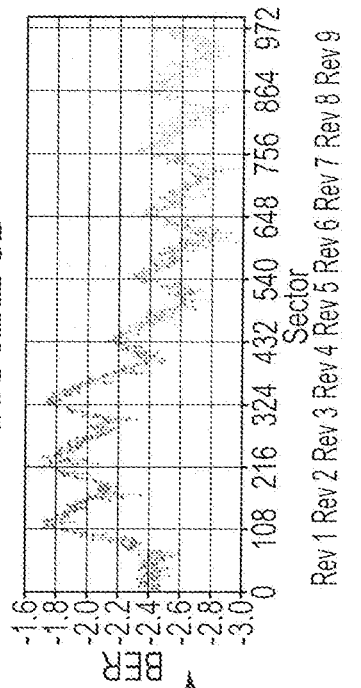
FIG. 8B shows the BER data per sector for each of the revolutions shown in FIG. 8A for the first head.
Figure 8C:
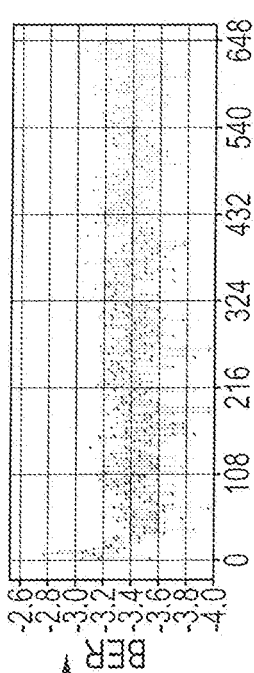
FIG. 8C shows the BER data per sector for each of the revolutions shown in FIG. 8A for the second head.
Figure 8A:
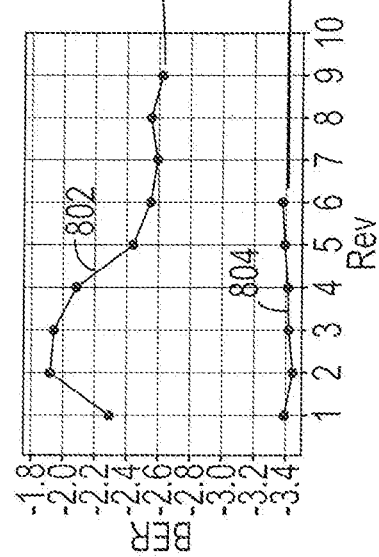
FIG. 8A is a graph of average BER versus disk revolution during sequential writes for two different HAMR heads.

FIG. 8A is a graph of average BER versus disk revolution during multi-revolution writes for two different HAMR heads. The first head produced the curve 802 which shows the characteristic profile of a laser mode hop beginning during the first revolution and subsiding at about the fifth revolution. FIG. 8B shows the BER data per sector for each of the revolutions shown in FIG. 8A for the first head. FIG. 8A also shows the curve 804 produced by the second head. As can be seen from curve 804, the second head shows little variation in the BER over six revolutions. FIG. 8C shows the BER data per sector for each of the six revolutions shown in FIG. 8A for the second head. In fact, there was a laser mode hop during the first revolution, but did not have a significant impact on BER.

Embodiments of the disclosure are directed to a laser mode hopping detection methodology that can be used during head manufacture and during the service life of a HAMR drive in the field. In the context of LMH detection during head manufacture, methodologies can be implemented to distinguish between HAMR heads that have nonexistent or non-severe LMH problems and heads having severe LMH problems. The heads having no or non-severe LMH problems can be built into a HAMR drive, while heads having severe LMH problems can be discarded. Sorting between acceptable and non-acceptable HAMR heads using an LMH detection methodology of the present disclosure can significantly reduce the risk of installing poor performing HAMR heads in drives that can fail in the field.

Figure 9:
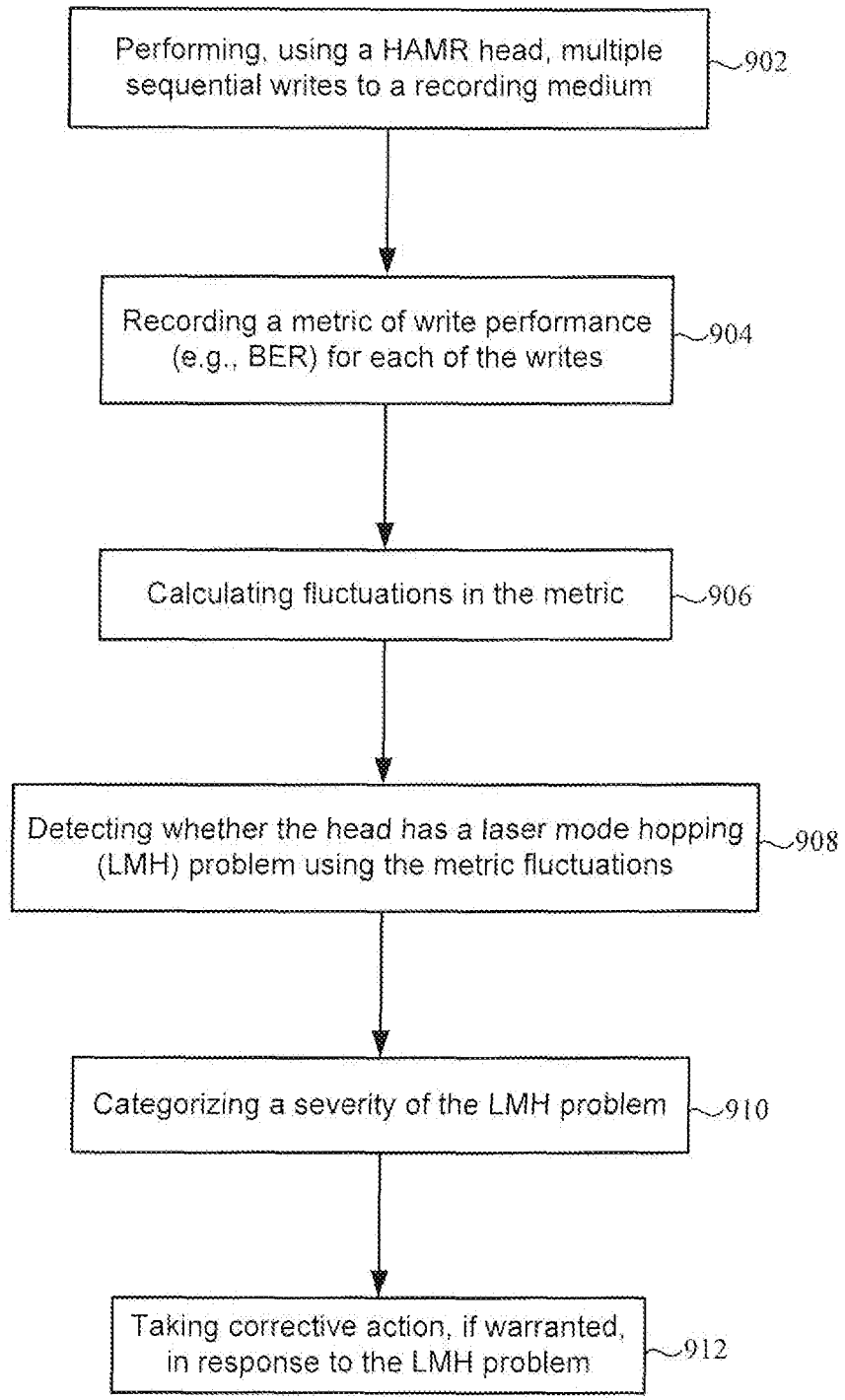
FIG. 9 is a flow chart of a laser mode hopping detection methodology in accordance with various embodiments.

Turning now to FIG. 9, there is shown a laser mode hopping detection methodology in accordance with various embodiments. The method shown in FIG. 9 involves performing 902 multiple sequential writes to a recording medium using a HAMR head, and recording 904 a metric of write performance for each of the writes. In some embodiments, the write performance metric is BER. In other embodiments, the write performance metric can be a sector write width or a sector amplitude. The method also involves calculating 906 fluctuations in the write performance metric, and detecting 908 whether the head has an LMH problem using the metric fluctuations. The method further involves categorizing 910 a severity of the LMH problem. In some embodiments, the method also involves taking 912 corrective action, if warranted, in response to the LMH problem. It is noted that instead of using a sequential write or multiple revolution BER, the sector write width or sector amplitude versus number of writes can be used to check the stability of the laser diode output.

Figure 10:
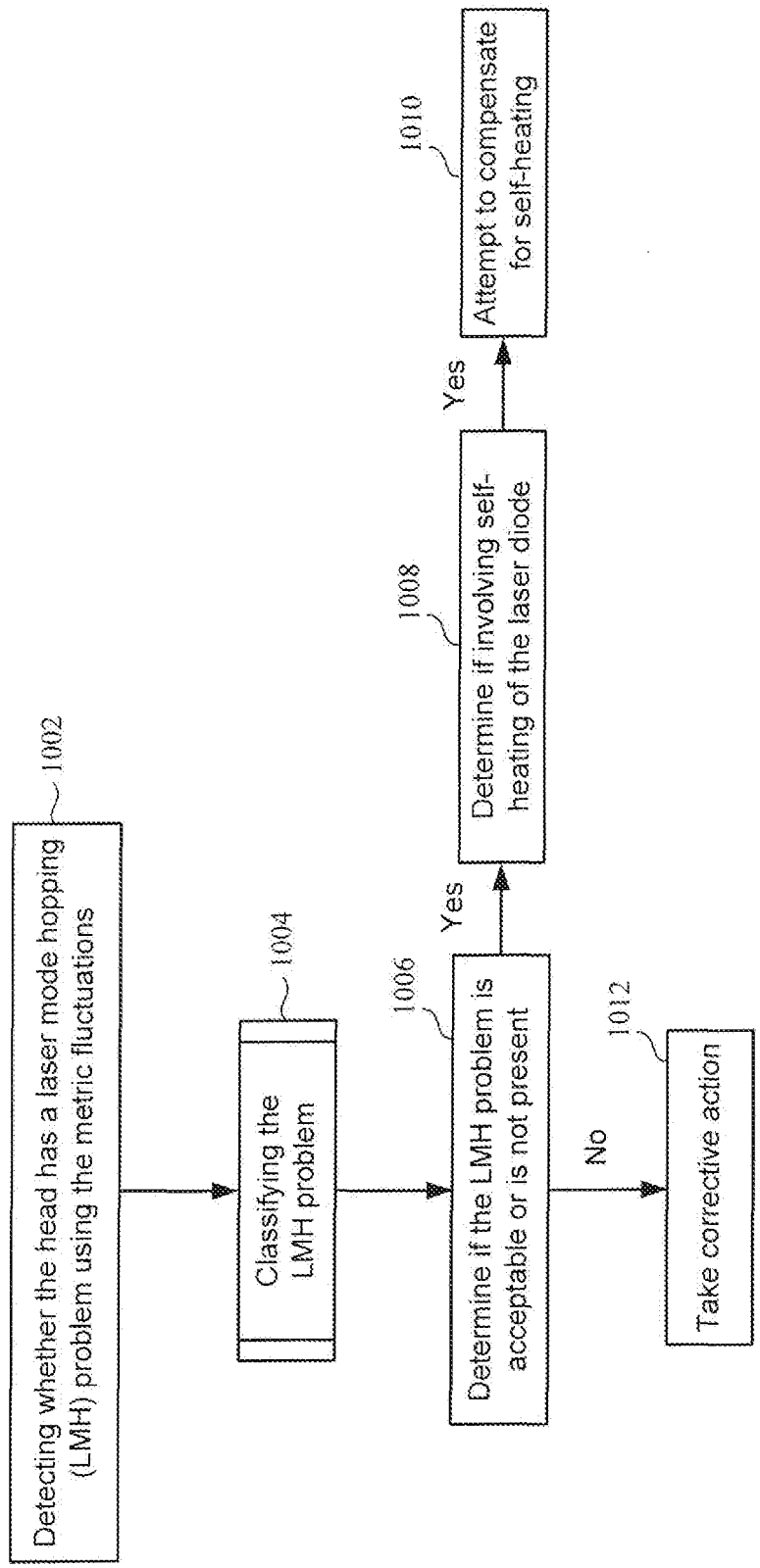
FIG. 10 is a flow chart of a laser mode hopping detection methodology in accordance with some embodiments.

FIG. 10 illustrates a laser mode hopping detection methodology in accordance with other embodiments. The method shown in FIG. 10 involves detecting 1002 whether the head has a laser mode hopping problem using the metric fluctuations described in the embodiment shown in FIG. 9. The method of FIG. 10 involves classifying 1004 the LMH problem. Classifying the LMH problem can involve the processes shown in blocks 1006-1014 according to various embodiments.

The head can be evaluated to determine 1006 if the LMH problem is acceptable or is not present. If the LMH problem is acceptable or nonexistent, a check is made to determine 1008 if self-heating of the laser diode is involved. If so, an attempt can be made to compensate 1010 for the self-heating, such as by implementing a laser bias compensation procedure. If the LMH problem is not acceptable or is severe, various forms of corrective action can be taken 1012. For example, laser bias current tuning can be attempted to mitigate the LMH (see, e.g., the method shown in FIG. 13). In another example, a write protect procedure can be implemented. As another example, short writes rather than long writes can be instigated. In another example, a read-after-write protocol can be implemented. In a further example, the host can be notified to refrain from long writes.

Figure 11:
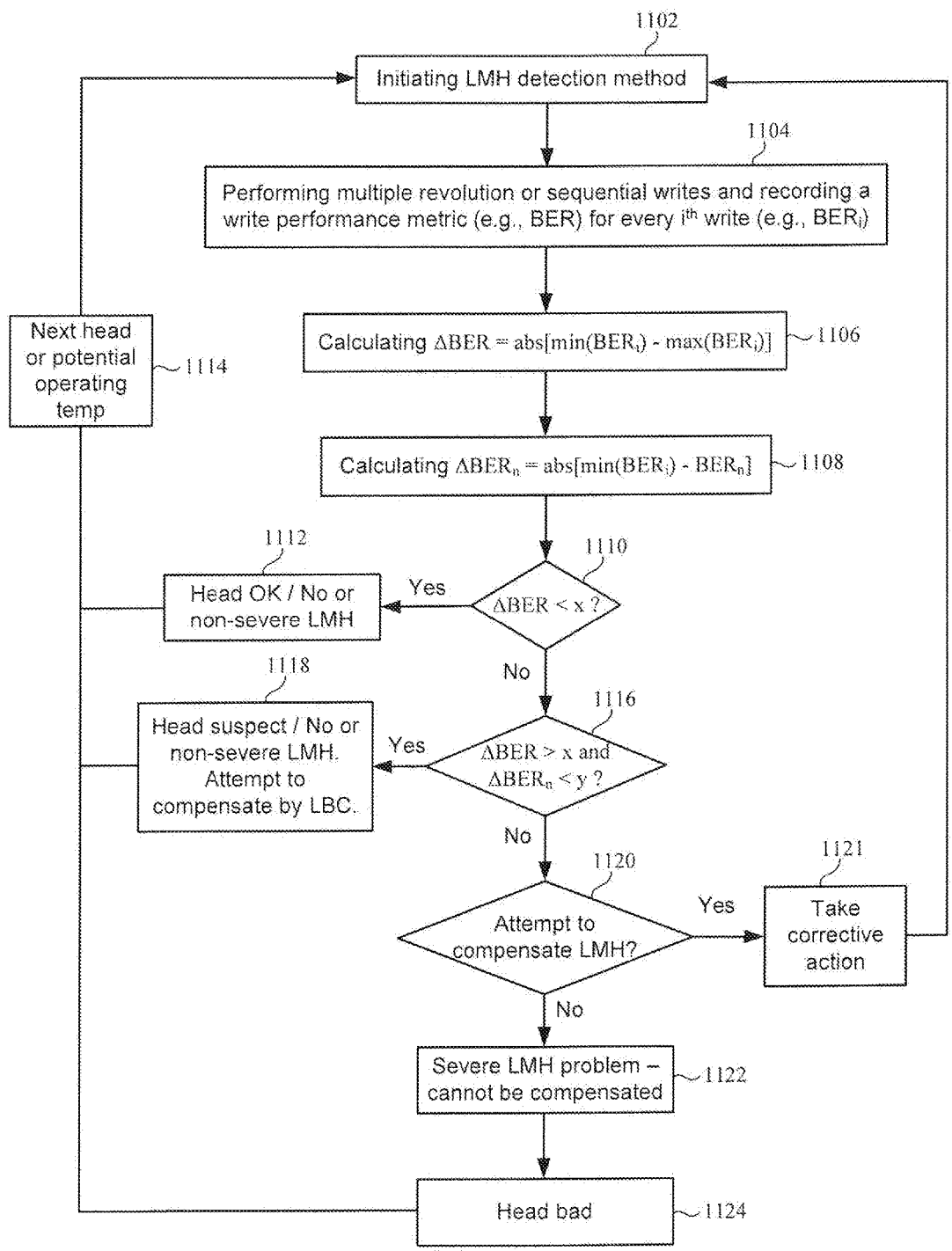
FIG. 11 is a flow chart of a laser mode hopping detection methodology in accordance with other embodiments.
Figure 12:
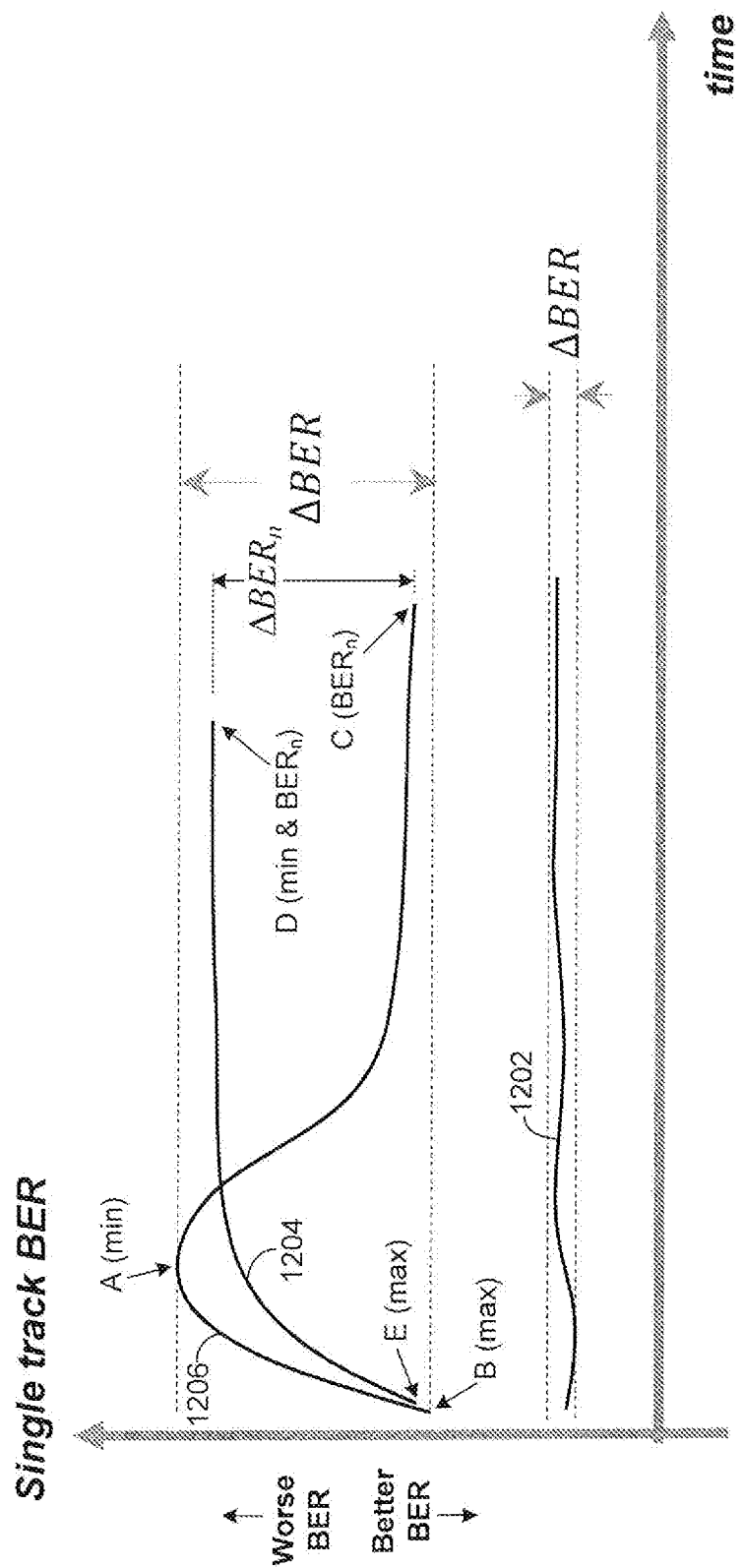
FIG. 12 is a graph of single track BER as a function of time for three different HAMR heads in accordance with various LMH detection embodiments.

FIG. 11 shows a laser mode hopping detection methodology in accordance with various embodiments. The graph of FIG. 12 is referenced in connection with the discussion of FIG. 11. FIG. 12 is a graph of multi-revolution writing single track BER or sequential writing BER as a function of time for three different HAMR heads. The method shown in FIG. 11 begins by initiating 1102 the LMH detection methodology, which can occur during head manufacture (e.g., head sorting) or in-situ the drive during use in the field (e.g., head monitoring). The method involves performing 1104 multiple revolution or sequential writes and recording a write performance metric (e.g., BER) for every $i^{th}$ write (e.g., $BER_i$). A graphical representation of such BER recordings is shown in FIG. 12 for the three different heads. Each of curves 1202, 1204, and 1206 is associated with one of the three heads under evaluation. It is noted that in FIG. 12, the BER decreases (gets worse) moving away from the origin along the positive y-axis of the graph, while the BER improves (gets better) moving toward the origin along the negative y-axis.

The method involves calculating 1106 a first difference in the write performance metrics indicative of a maximum difference in the metrics, which is represented as ΔBER in FIGS. 11 and 12. ΔBER is the absolute value of the difference between the minimum and maximum recorded BER values, which is given as ΔBER=abs[min(BER$_i$)–max (BER$_i$)]. Referring to FIG. 12 and curve 1206, ΔBER is shown as the difference between the minimum BER at point A and the maximum BER at point B, which is a significant difference. For curve 1204, ΔBER (not shown in FIG. 12) is the difference between the minimum BER at point D and the maximum BER at point E, which is also a significant difference. For curve 1202, ΔBER (not shown in FIG. 12) is small (negligible).

The method also involves calculating 1108 a second difference in the write performance metrics indicative of a difference between a minimum of the metrics and a metric for the last sequential write, which is represented as ΔBER$_n$ in FIGS. 11 and 12. Referring again to FIG. 12, ΔBER$_n$ for curve 1206 is shown as the difference between the minimum BER at point A and the BER for the last sequential write at point C, which is given as ΔBER$_n$=abs[min(BER$_i$)–BER$_n$]. It can be seen that, for curve 1206, the magnitude of both ΔBER and ΔBER$_n$ is significant. It can also been seen that, for curve 1204, the magnitude of ΔBER (Δ between points D and E) is significant but ΔBER$_n$ is negligible. In the illustration of FIG. 12, the point D of curve 1204 represents both the minimum BER and the BER for the last sequential write, hence a difference of zero. For curve 1202, ΔBER$_n$ is negligible.

A comparison 1110 is made to determine if the first difference, ΔBER, exceeds a first threshold, x, which is a user-defined threshold. The value of x, for example can range between about 0.1 and 1 decade (user defined). If ΔBER is less than the threshold x, the head is deemed 1112 acceptable, such that the head has no or non-severe LMH and no significant self-heating (e.g., no LBC is needed). In FIG. 12, the curve 1202 for one of the three heads under evaluation has relatively little variation in BER. This modest variation in BER indicates the absence of laser mode hopping or the presence of non-severe LMH. For curves 1204 and 1206, the variation in BER for these curves is significant and exceeds the threshold x. For curve 1202 (acceptable ΔBER), the method returns to block 1102 for execution at the next potential operating temperature for this head or for testing of the next head 1114. During manufacture, for example, a HAMR head can be subject to the methodology shown in FIG. 11 at different operating temperatures in an attempt to evaluate the head for potential laser mode hopping across a range of operating temperatures. For curves 1204 and 1206, the method fails at decision block 1110 and proceeds to decision block 1116.

If ΔBER is greater than the threshold x, comparisons are made 1116 to determine if (a) ΔBER is greater than x and (b) ΔBER$_n$ is less than a second threshold, y, which is also a user-defined threshold. The value of y, for example, can range between about 0.1 and 1 decade (user defined). If ΔBER is greater than the threshold x and ΔBER$_n$ is less than the threshold y, the head has either no LMH problem or a non-severe LMH problem 1118, but has self-heating. An attempt can be made to compensate for the self-heating, such as by implementing an LBC procedure. In this regard, the head is considered to have a non-severe correctable LMH problem. The head from which curve 1204 was generated satisfies the criteria of decision block 1116, indicating this head has no or non-severe LMH but is experiencing self-heating of the laser diode. The method returns to block 1102 for execution at the next potential operating temperature for this head or for testing of the next head 1114. The head from which curve 1206 was generated does not satisfy the criteria of decision block 1116, and the method proceeds to decision block 1120 for this head.

Decision block 1120 is entered under the conditions that ΔBER is greater than the first threshold, x, and ΔBER$_n$ is greater than the second threshold, y. Because ΔBER is greater than the threshold x and ΔBER$_n$ is greater than the threshold y, the head is deemed to have a severe LMH problem. A decision 1120 can be made whether to compensate for the LMH. If yes, then corrective action can be taken 1121 to mitigate the LMH. If no, the head is deemed 1122 to have a severe LMH problem that cannot be compensated or corrected. In this case, the head is determined 1124 to be bad. The head from which curve 1206 was generated does not satisfy the criteria of decision block 1116, indicating that this head has a severe LMH problem. In the context of a head sorting process during head manufacture, for example, the bad head would be discarded and not used in a HAMR drive (deemed to have a severe LMH problem). In the context of in-service (in-situ) detection, various forms a corrective action can be taken, such as those previously described. The method returns to block 1102 for testing of the next head 1114.

Figure 13:
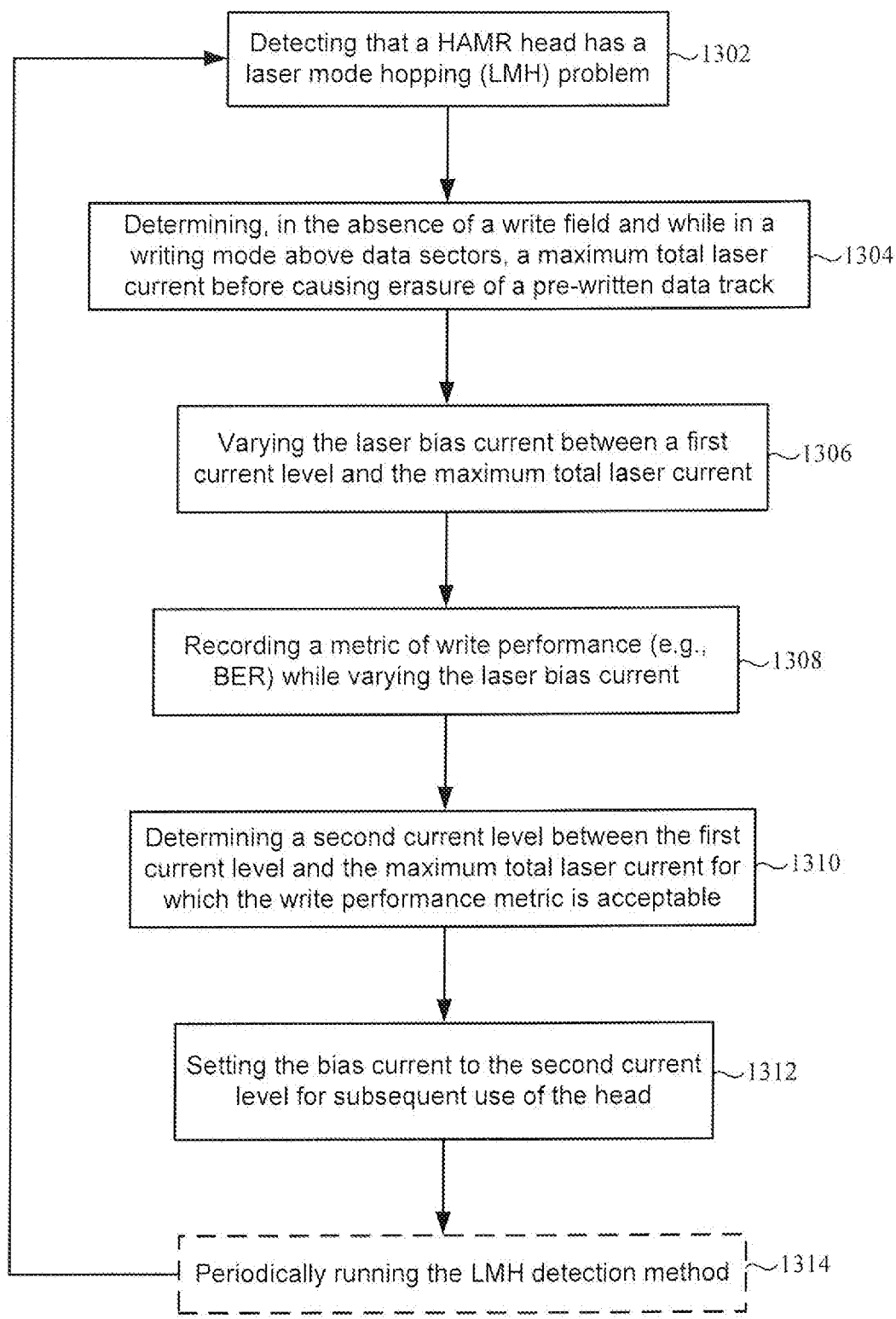
FIG. 13 is a flow chart of a method for correcting laser mode hopping problems in HAMR heads by tuning the laser bias current of the laser diode in accordance with various embodiments.

Turning now to FIG. 13, there is shown a method for correcting laser mode hopping problems in HAMR heads by tuning the laser bias current of the laser diode in accordance with various embodiments. The method shown in FIG. 13 can be used for heads experiencing non-severe and severe laser mode hopping problems. To facilitate an understanding of the correction methodology, the following definitions are provided. The term "total laser current" (I$_{total}$) refers to the total laser current applied to the laser diode. The term "laser threshold current" (I$_{th}$) refers to the threshold current for the laser diode. If the applied total laser current, I$_{total}$, is smaller than the threshold current, I$_{th}$, there is no laser diode output. If the applied total laser current, I$_{total}$, is greater than the threshold current, I$_{th}$, an output is produced by the laser diode. The term "laser bias current" (I$_b$) refers to the total laser current applied to the laser diode when the head is in a read mode. The term "laser operating current" (I$_{op}$) represents the delta between total laser current applied to the laser diode when writing data and the laser bias current, and is given by I$_{op}$=I$_{total}$–I$_b$.

The correction methodology shown in FIG. 13 assumes that a laser mode hopping problem has been detected 1302 for a particular HAMR head. The method involves determining 1304, in the absence of a write field and while in a writing mode above data sectors, a maximum total laser current that can be applied to the laser diode before causing erasure of a pre-written data track on the recording medium. According to one approach, and with reference to FIGS. 14 and 15, a laser sweep is performed on a pre-written data track of the recording medium while operating in a writing mode but under a zero magnetic writing field (absence of a write field). While keeping the laser bias current at an initial laser bias, I$_{b1}$, the laser sweep is run for the total laser current, I$_{total}$, above data sectors of the pre-written track. The initial laser bias, I$_{b1}$, can be the value of the laser bias current, I$_b$, at which a laser mode hopping problem occurred.

Figure 14:
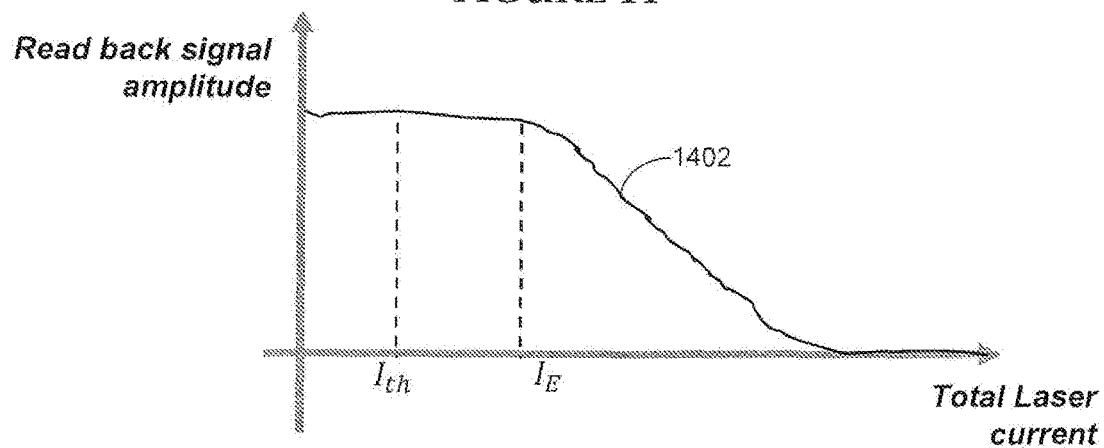
FIG. 14 is a graph of read back signal amplitude data as a function of total erasing laser current acquired during the LMH correction methodology shown in FIG. 13.

During the laser sweep, a read back signal acquired from a reader of the head is measured at the data sectors (see read back signal 1402 in FIG. 14). The total laser current, I$_{total}$, is incrementally increased until the read back signal or bit error rate starts to decrease (near the knee in the curve 1402). This value of the total laser current, I$_{total}$, is shown as I$_E$, in FIG. 14. $I_E$ represents the maximum total laser current, $I_{total}$, that can be applied to the laser diode before causing erasure of the pre-written data track. The purpose of the laser sweep procedure is to determine the maximum amperage ($I_E$) to which the laser bias, $I_b$, can be adjusted during the LMH correction procedure.

Figure 15:
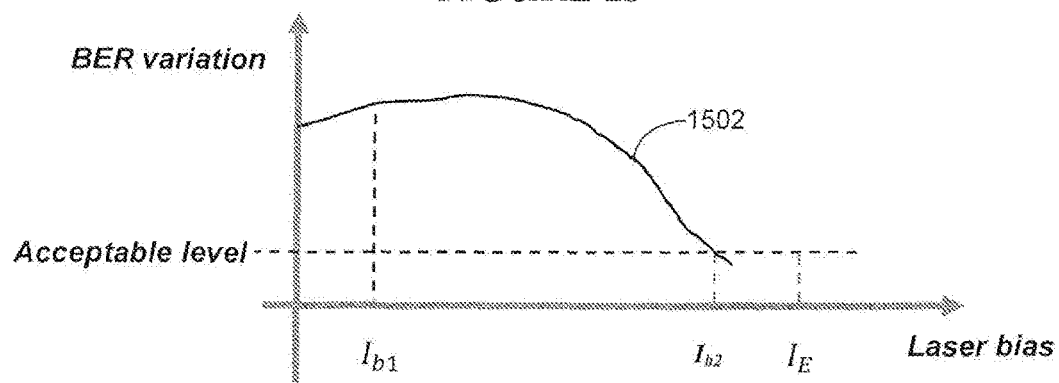
FIG. 15 is a graph of BER variation data as a function of laser bias current acquired during the LMH correction methodology shown in FIG. 13.

FIG. 15 is a graph showing the variation in BER as a function of laser bias current, $I_b$. Having determined the upper limit ($I_E$) to which the laser bias current, $I_b$, can be adjusted, the correction methodology of FIG. 13 continues by varying 1306 the laser bias current, $I_b$, between a first current level (e.g., $I_{b1}$) and the maximum total laser current ($I_E$). Since the sequential writing or multiple revolution BER shows unacceptable variation at the initial laser bias current $I_{b1}$, the laser bias current, $I_b$, can be increased or decreased within the range [0, $I_E$], keeping the total laser current, $I_{total}$, during writing the same as before. The sequential writing or multiple revolution BER can be re-checked during adjustment of the laser bias current, $I_b$, until the BER variation is acceptable and the resulting laser bias current, $I_b$, is less than the maximum total laser current, $I_E$.

The method involves recording 1308 a metric of write performance (e.g., BER) while varying the laser bias current, $I_b$, within the range [0, $I_E$]. The curve 1502 shown in FIG. 15 illustrates how the BER varies as a function of laser bias current, $I_b$. The method further involves determining 1310 a second current level, $I_{b2}$, between the first current level, $I_{b1}$, (or zero) and the maximum total laser current, $I_E$, for which the write performance metric (BER) is acceptable. As can be seen in FIG. 15, the BER improves (decreases) as the laser bias current increases from $I_{b1}$ to $I_E$. At the laser bias current $I_{b2}$, the BER is deemed acceptable and is below the maximum total laser current, $I_E$. The method continues with setting 1312 the bias current, $I_b$, of the laser diode to the second current level $I_{b2}$ for subsequent use of the head. The LMH detection method discussed previously can be run subsequently and periodically 1314 to confirm that laser mode hopping has been ameliorated by the change of the laser bias current from $I_{b1}$ to $I_{b2}$.

Figure 16:
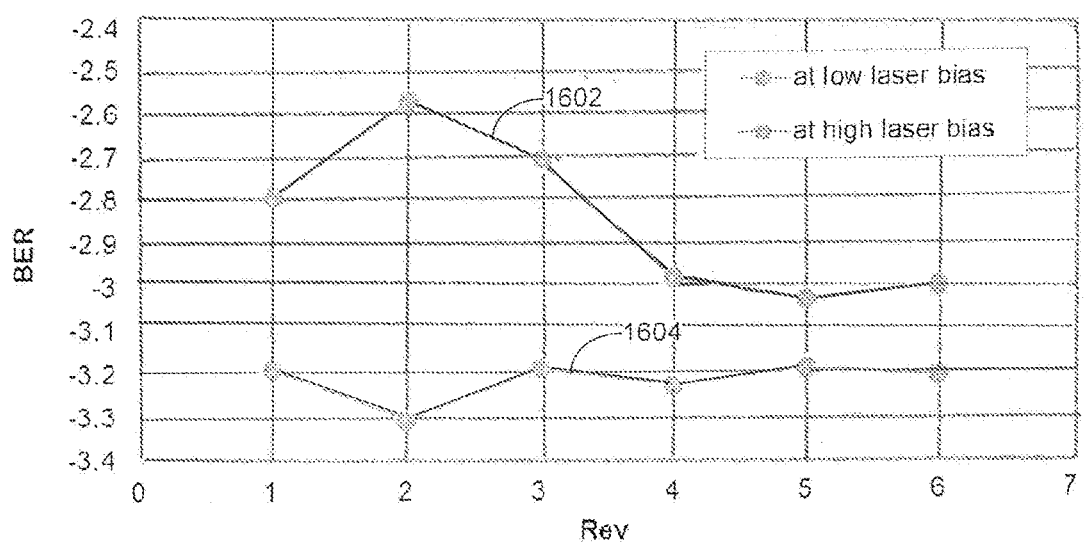
FIG. 16 is a graph showing BER as a function of disk revolution for a HAMR head before and after implementing the correction methodology illustrated in FIG. 13.

FIG. 16 is a graph showing bit error rate as a function of disk revolution for a HAMR head before and after implementing the correction methodology illustrated in FIG. 13. The data shown in FIG. 16 was acquired from spinstand testing of the head. Curve 1602 shows the variation in BER for the head at a low laser bias current, $I_b$ (e.g., $I_{b1}$ shown in FIG. 15). The curve 1602 has the characteristic profile indicating the occurrence of laser mode hopping. The curve 1604 was acquired after implementing the correction methodology shown in FIG. 13, and shows the variation in BER for the head at a high laser bias current, $I_b$ (e.g., $I_{b2}$ shown in FIG. 15). It can be seen that the curve 1604 has a significantly reduced BER variation.

Figure 17:
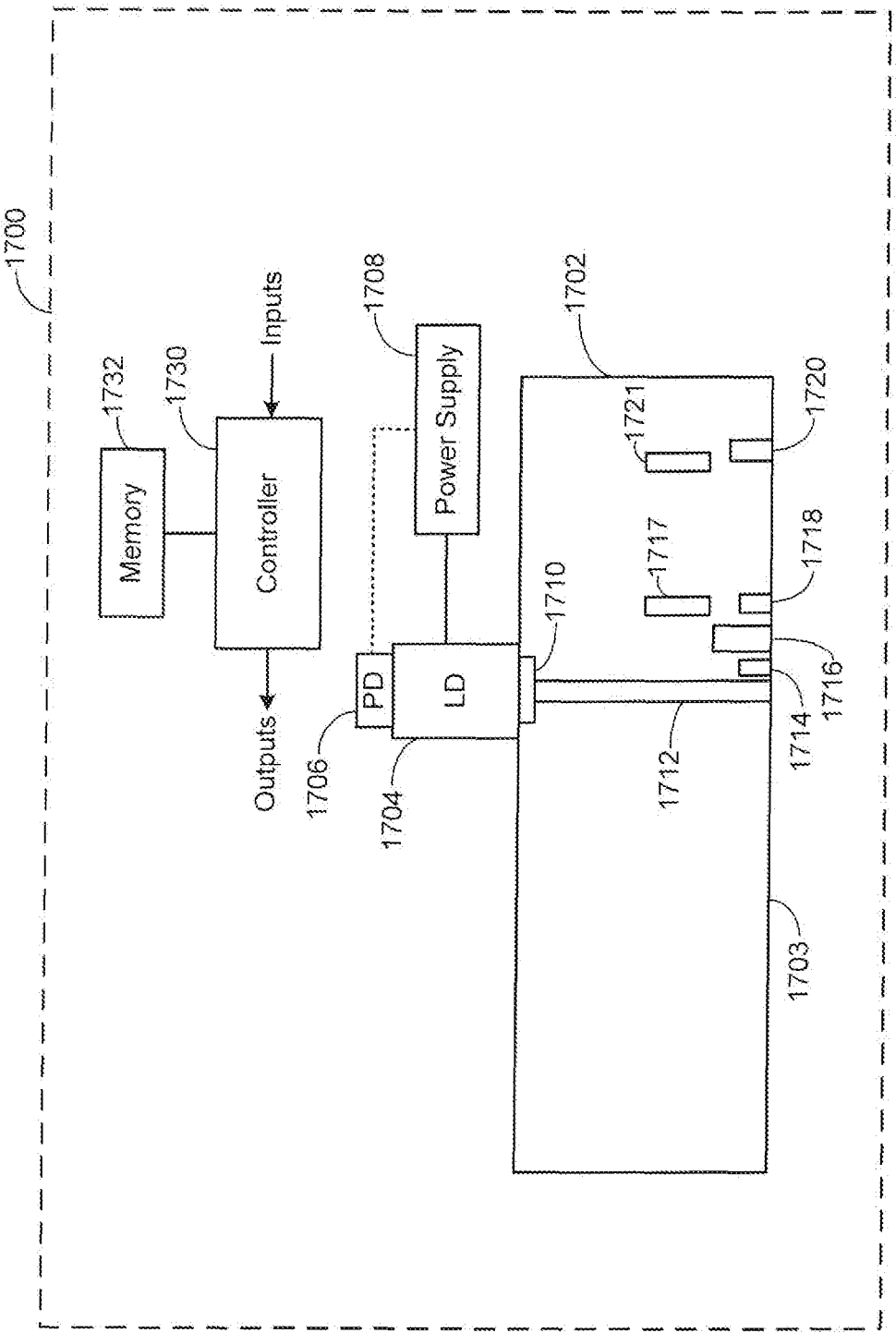
FIG. 17 is a block diagram of an apparatus for implementing an LMH detection methodology and a correction methodology inside a HAMR drive in accordance with various embodiments.

FIG. 17 is a block diagram of an apparatus for implementing an LMH detection methodology and correction methodology inside a HAMR drive in accordance with various embodiments. FIG. 17 shows a portion of a HAMR drive 1700 which includes a slider 1702 upon which a laser diode 1704 is mounted. A photodetector 1706 is mounted on or in close proximity to the laser diode 1704. A power supply 1708 is coupled to the laser diode 1704 and provides a current ($I_{total}$, $I_b$, $I_{op}$) to the laser diode 1704. An output of the photodetector 1706 is coupled to the power supply 1708. The power supply 1708 can adjust the current supplied to the laser diode 1704 in response to the photodetector output and in accordance with embodiments disclosed herein.

The slider 1702 includes a number of components including an optical waveguide 1712 which is optically coupled to the laser diode 1704 via an optical coupler 1710. The optical waveguide 1712 extends from the optical coupler 1710 to an NFT 1714 situated at the air bearing surface 1703 proximate the optical waveguide 1712. A writer 1716 is situated proximate the NFT 1714. A heater 1717 is situated proximate the writer 1716 and configured to thermally actuate the writer 1716. A reader 1720 is situated at the ABS 1703. A heater 1721 is situated proximate the reader 1720 and configured to thermally actuate the reader 1720.

A portion of the NFT 1714 can contact a write pole of the writer 1716, serving as a heatsink for the NFT 1714. A contact sensor 1718 is situated proximate the writer 1716 and NFT 1714 (e.g., at a close point of the writer). In some embodiments, the contact sensor 1718 can be located on the opposite side of the waveguide 1712. In some configurations, the contact sensor 1718 can be situated equidistant from the writer 1716 and the reader 1720.

The HAMR head 1700 includes a controller 1730 coupled to a memory 1732. As shown in FIG. 17, the controller 1730, which includes one or more processors, receives a number of inputs from various components of the drive 1700 and produces various outputs to implement the LMH detection and correction methodologies described hereinabove.

A laser mode hopping detection methodology of the present disclosure can be used to detect severe laser mode hopping problems in a HAMR head. The LMH detection methodology can be used to classify different types of LMH and distinguish between severe and no or non-severe LMH problems. The LMH detection methodology can be applied at the component level for head sorting and/or at the drive level at the earliest stage possible before entering other processes, such as reliability processes. The LMH detection methodology can be used to periodically check for LMH problems in the heads of a HAMR drive, and can be used for troubleshooting when HAMR drive performance degrades. When implemented in-situ a HAMR drive, the output of the method can be used as a trigger of action, such as reporting the existence of LMH, triggering a solution for LMH, triggering a read-after-write procedure, triggering a revolution-based write procedure, or reporting head degradation to a host, among other actions.

Various embodiments discussed above involve changing the laser bias current, $I_b$, in an attempt to reduce or eliminate the occurrence of laser mode hopping of a HAMR head. Changing the laser bias current, $I_b$, serves to change the junction temperature of the laser diode. Various alternative methodologies involve changing the laser diode junction temperature using parameters other than laser bias current, $I_b$. For example, a heater can be incorporated adjacent the laser diode of to HAMR head which can be controlled to adjustably heat the laser diode. The writer heater and/or reader heater can be adjusted during writing to change the junction temperature of the laser diode. The writer heater and/or reader heater can be adjusted during a preheat phase in order to change the junction temperature of the laser diode. A laser overshoot can be added to change the junction temperature of the laser diode.

Systems, devices or methods disclosed herein may include one or more of the features structures, methods, or combination thereof described herein. For example, a device or method may be implemented to include one or more of the features and/or processes above. It is intended that such device or method need not include all of the features and/or processes described herein, but may be implemented to include selected features and/or processes that provide useful structures and/or functionality. Various modifications and additions can be made to the disclosed embodiments discussed above. Accordingly, the scope of the present disclosure should not be limited by the particular embodiments described above, but should be defined only by the claims set forth below and equivalents thereof.

What is claimed is:

1. A method, comprising:
performing, using a heat-assisted magnetic recording head, multiple sequential writes to a recording medium;
recording a metric of write performance for each of the writes;
calculating fluctuations in the metric;
detecting whether the head has a laser mode hopping (LMH) problem using the metric fluctuations; and
categorizing a severity of the LMH problem.

2. The method of claim 1, wherein categorizing the severity of the LMH problem comprises categorizing the LMH problem as one of a severe LMH problem and a non-severe or nonexistent LMH problem.

3. The method of claim 1, wherein categorizing the severity of the LMH problem comprises categorizing the LMH problem as one of:
an acceptable or nonexistent LMH problem;
a non-severe or nonexistent LMH problem with self-heating of a laser diode of the head; and
a severe LMH problem.

4. The method of claim 1, wherein detecting whether the head has an LMH problem comprises:
calculating one or more differences in the write performance metrics; and
comparing the one or more metric differences to one or more thresholds.

5. The method of claim 1, wherein detecting whether the head has an LMH problem comprises:
calculating a first difference in the write performance metrics indicative of a maximum difference in the metrics;
calculating a second difference in the write performance metrics indicative of a difference between a minimum of the metrics and a metric for the last sequential write;
comparing the first difference to a first threshold; and
comparing the second difference to a second threshold.

6. The method of claim 5, wherein categorizing the severity of the LMH problem comprises:
categorizing the severity of the LMH problem as a non-severe or nonexistent LMH problem with self-heating of a laser diode of the head in response to the first difference exceeding the first threshold and the second difference failing to exceed the second threshold.

7. The method of claim 5, wherein categorizing the severity of the LMH problem comprises:
categorizing the severity of the LMH problem as a severe LMH problem in response to the first difference exceeding the first threshold and the second difference exceeding the second threshold.

8. The method of claim 5, wherein categorizing the severity of the LMH problem comprises:
categorizing the severity of the LMH problem as an acceptable LMH problem or an absence of an LMH problem in response to the first difference failing to exceed the first threshold.

9. The method of claim 1, wherein the method comprises:
performing the method for a plurality of HAMR heads during head manufacture; and
sorting the heads between usable and unusable heads based on the severity categorization.

10. The method of claim 1, wherein the method comprises:
performing the method during a service life of the head; and
taking corrective action if warranted based on the severity categorization.

11. An apparatus, comprising:
a heat-assisted magnetic recording head comprising a reader, a writer, and a near-field transducer optically coupled to a laser diode via an optical waveguide; and
a controller of the head configured to:
perform multiple revolution writes or sequential writes to a recording medium;
record a metric of write performance for each of the writes;
calculate fluctuations in the metric;
detect whether the laser diode has a laser mode hopping (LMH) problem using the metric fluctuations; and
categorize a severity of the LMH problem.

12. The apparatus of claim 11, wherein the controller is configured to categorize the LMH problem as one of a severe LMH problem and a non-severe LMH problem.

13. The apparatus of claim 11, wherein the controller is configured to categorize the LMH problem as one of:
an acceptable or nonexistent LMH problem;
a non-severe or nonexistent LMH problem with self-heating of the laser diode; and
a severe LMH problem.

14. The apparatus of claim 11, wherein the controller is configured to:
calculate one or more differences in the write performance metrics; and
compare the one or more metric differences to one or more thresholds.

15. The apparatus of claim 11, wherein the controller is configured to:
calculate a first difference in the write performance metrics indicative of a maximum difference in the metrics;
calculate a second difference in the write performance metrics indicative of a difference between a minimum of the metrics and a metric for the last sequential write;
compare the first difference to a first threshold; and
compare the second difference to a second threshold.

16. The apparatus of claim 15, wherein the controller is configured to:
categorize the severity of the LMH problem as a non-severe or nonexistent LMH problem with self-heating of the laser diode in response to the first difference exceeding the first threshold and the second difference failing to exceed the second threshold.

17. The apparatus of claim 15, wherein the controller is configured to:
categorize the severity of the LMH problem as a severe LMH problem in response to the first difference exceeding the first threshold and the second difference failing to exceed the second threshold.

18. The apparatus of claim 15, wherein the controller is configured to:
categorize the severity of the LMH problem as an acceptable LMH problem or an absence of an LMH problem in response to the first difference failing to exceed the first threshold.

19. The apparatus of claim 15, wherein the controller is configured to take corrective action if warranted based on the severity categorization.

20. A method, comprising:
in response to detecting that a heat-assisted magnetic recording head has a laser mode hopping problem:
- determining, in the absence of a write field producible by the head and during a writing mode above data sectors, a maximum total laser current that can be applied to a laser diode of the head before causing erasure of a pre-written data track of a recording medium, the total laser power comprising a sum of an operational current, $I_{op}$, required for writing and a bias current, $I_b$, applied to the laser diode while the head is in a read mode;
- varying the bias current $I_b$, between a first current level and the maximum total laser current, the first current level being less than the maximum total laser current;
- recording a metric of write performance while varying the bias current, $I_b$, between the first current level or zero and the maximum total laser current;
- determining a second current level between the first current level and the maximum total laser current for which the write performance metric is acceptable; and
- setting the bias current, $I_b$, to the second current level for subsequent use of the head.

* * * * *